DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 789

T908,005

CONTROL OF PLANT PARASITIC NEMATODES WITH 2-BENZIMIDAZOLE-CARBAMIC ACID, METHYL ESTER

Edward J. Soboczenski, R.D. 1, Chadds Ford, Pa.

Filed Oct. 27, 1971, Ser. No. 193,167

Int. Cl. A01n *9/22*

U.S. Cl. 424—273

No Drawing. 5 Pages Specification

The compound 2-benzimidazolecarbamic acid, methyl ester is useful for the control of plant parasitic nematodes. Thus when the compound is applied to soil, to seeds, to foliage, or to the nematodes at rates of .05 to 50 kilograms/hectare or .05 to 2.0% by weight of the seeds, plant parasitic nematodes such as the dagger, cyst, needle, stubby root, and bud and leaf nematodes are controlled.